Patented Jan. 25, 1927.

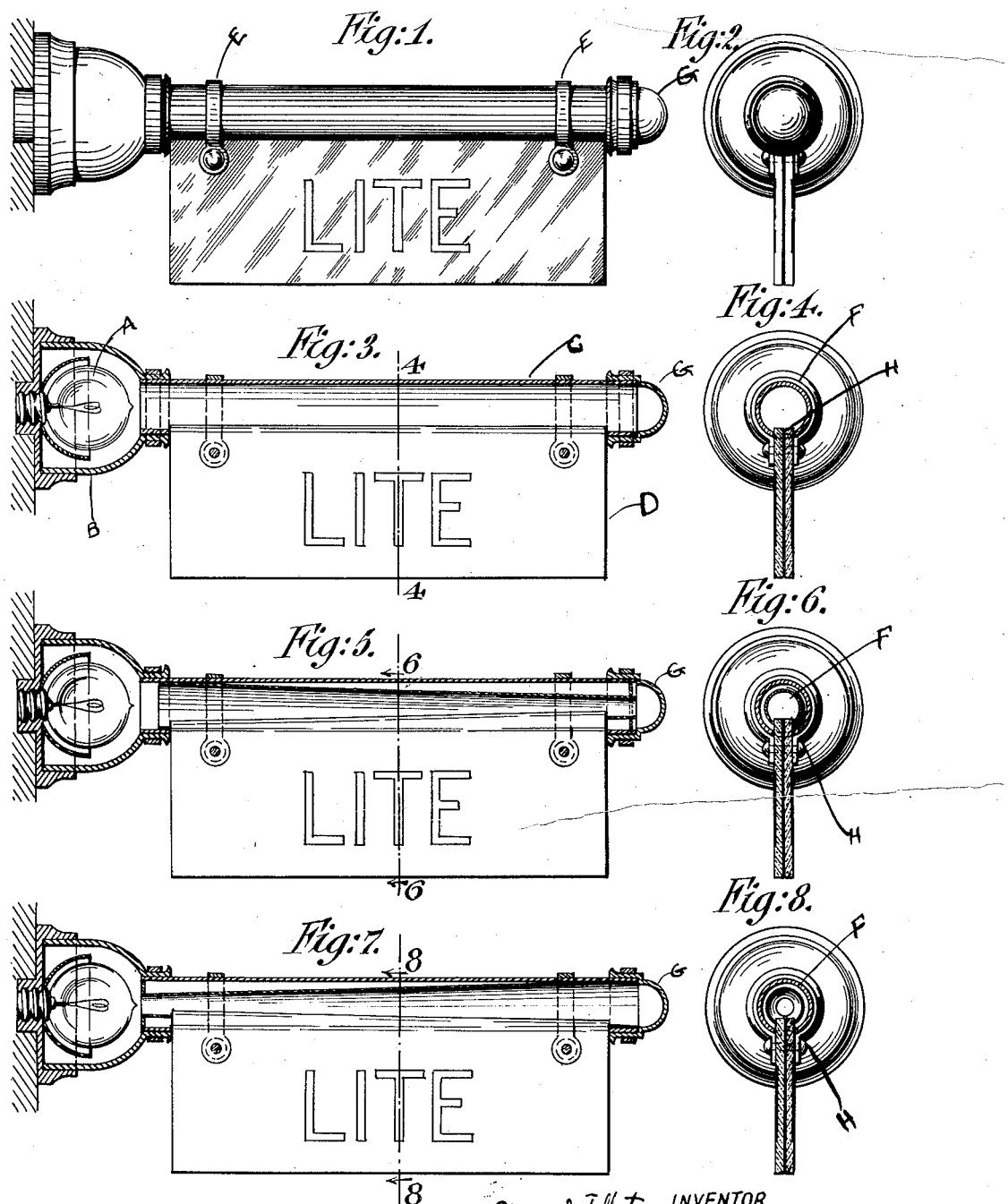

1,615,449

UNITED STATES PATENT OFFICE.

CLARENCE A. FULLERTON, OF NEW YORK, N. Y.

DISPLAY SIGN.

Application filed March 27, 1925. Serial No. 18,682.

My invention relates to display signs and more particularly to illuminated electric signs in which the illumination is indirect rather than direct.

A further object of my invention is to provide an illuminated electric sign of simple construction which will function by the use of a single incandescent lamp of the ordinary shape and which will use a minimum of current to produce a maximum of display.

Further objects of the invention will be apparent from the drawings in which

Fig. 1 is a perspective of my improved sign.

Fig. 2 is an end view of the sign shown in perspective Fig. 1.

Fig. 3 is a longitudinal sectional view of my improved display sign.

Fig. 4 is a section along the lines 4—4 of Fig. 3.

Fig. 5 is a longitudinal sectional view of a slightly different form of sign,

Fig. 6 being a cross section 6 along the lines 6—6 of Fig. 5.

Fig. 7 represents still another embodiment showing a longitudinal sectional view of my improved sign, Fig. 8 being a cross section along the lines 8—8 of Fig. 7.

My improved sign consists essentially of three elements: 1. A source of light. 2. An elongated covering or housing for said source of light. 3. A glass display sign inserted into the elongated house 2.

A represents a source of light which is an ordinary incandescent bulb secured in the opaque canopy B to which is attached the elongated tube, also opaque, C. In a slit in the elongated tube C is positioned a glass plate D on which for purposes of illustration, the display letters, "L-i-t-e" in this drawing, are shown. In the interior of the tube C, the strips E and E' serve to hold the plate D in engagement with the tube C. Inside the tube C is positioned a smaller tube F which acts as a reflector and disseminator of the light rays from the lamp A. In Fig. 3, the tube F is shown as cylindrical in section. In Fig. 5, it is shown as conical in section and in Fig. 7 also as conical, but with a small end placed toward the source of light A. In practice, I find it expedient to give a metallic surface to the inside of the tube F so as to have a minimum absorption of the light rays on the inside of the tube though the portion of the tube adjacent the glass display sign D must not be silvered, but must be transparent to the light rays so that they can pass freely outward through the glass plate D. The opaque cap G closes the tube C. It will be obvious that the tube F having a highly reflecting surface therein, the rays of light passing from the lamp A, will be freely irradiated and diffused through the slit H downward, as shown in the drawings and there will be a minimum of absorption of the light rays in the tube C itself. The different forms of the tube F as shown in Figs. 5 and 7 provide for varying degrees of irradiation through the slit H downward. Inasmuch as the different portions of the tube F are at varying distances from the source of light A, the amount of light thrown downward through the glass plate D will be of varying intensity due to the varying distance of the parts of the plate D from the source of light. To correct this variation, a conical tube as shown in Fig. 5, may be used, for it will be seen that in this modification, the light will become more concentrated in the tube as the diameter of the tube F, becomes smaller. In Fig. 7 a form of tube is shown with the opposite effect to that shown in Fig. 5.

Furthermore the amount of irradiation and reflection may be controlled by providing the tube F with varying reflecting means over a portion of its surface or by changing the shape of the tube F or by other means so that a light of equal intensity throughout the surface thereof or a light of varying intensity for the various parts of the plate D, may be produced at will.

I am aware that it is old to produce illuminated signs of this character where the light is directly positioned above the glass plate, but I believe the particular display light and sign as shown in the drawings and specification herein, is novel.

Having thus fully described my invention, what I claim is:

I claim:

1. In an electrical sign, the combination of an incandescent bulb, an approximately spherical opaque housing therefor, with an opening in said housing and an opaque cylindrical elongated tube attached in said opening, reflecting means inside of said tube and a longitudinal slit in the bottom of said tube, a glass display plate being vertically suspended in said slit.

2. In an electric sign, the combination of an incandescent bulb, an approximately spherical opaque housing therefor, an opening in said housing, an opaque cylindrical elongated tube attached in said opening and a horizontal slit in said tube, and a glass display plate being vertically suspended in said slit and means for diffusing the light uniformly over the surface of said plate.

3. In an electric sign, the combination of an incandescent bulb, an opaque housing therefor, a cone-shaped elongated tube attached in said opening, a horizontal slit in said tube, a glass display plate vertically suspended in said slit and reflecting means in said tube by which the light from said incandescent bulb is uniformly diffused over said plate.

In testimony whereof I affix my signature.

CLARENCE A. FULLERTON.